March 20, 1928. 1,663,225

F. J. WIDMAN

TOOL

Filed Nov. 17, 1926

Inventor.
Frank J. Widman,
By [signature]
Atty.

Patented Mar. 20, 1928.

1,663,225

UNITED STATES PATENT OFFICE.

FRANK J. WIDMAN, OF OAK PARK, ILLINOIS.

TOOL.

Application filed November 17, 1926. Serial No. 148,797.

The present invention relates to tool construction and assembly, as well as a means and method of producing a new and improved assembled tool member, the utility of the tool being general but specifically applicable to a carving and routing tool in combination.

Among the objects of the invention are included the following:

A new and improved compound tool which may readily be inserted into a chuck or other holding member provided therefor;

A unique and improved structure for a multiple part tool facilitating its assembly as well as its manufacture;

The combination with an assembly of plural part tools of a cutting or carving nature of a chuck of a unique pattern, the arrangement thereof providing for the secure combination of the assembled units;

The production of an improved carving and routing tool by an improved method of manufacture, the tool comprising a plurality of parts or independent members of like or of different nature, the assembled compound tool being adapted to perform a series of operations not possible with an ordinary integral tool;

The combination with a chuck of improved type with a number of elements, the elements being adapted to provide a compound tool for use in wood working and in other arts, the structure of the tool and its parts and their assembly in such chuck providing a secure structure for the tool during use.

These, and such other objects as may hereinafter appear, are attained by the novel construction, combination, and arrangement of the several elements which constitute the tool and chuck, two forms of tools being shown in the attached drawing, hereby made a part of this application, and in which Figure 1 is an elevation, partly in section, of the improved chuck and a tool assembled therein, a part of the chuck being broken away to show the impinging action of the other part of the chuck;

Like reference characters are used to designate similar parts in the drawing and in the description of the invention which follows.

The tool hereinafter described is adapted to be used in a chuck. The chuck forms a holding portion for the parts of the tool and is therefore essential in its operation. A chuck is necessary for the proper functioning of the tools as is hereinafter pointed out. The tool itself is ordinarily made in a plurality of parts, each constituting a separate and independent tool element, the assembly of the independent tool members providing a unique multiple tool, and generally a tool which can not be duplicated in an integral structure.

Figure 1:
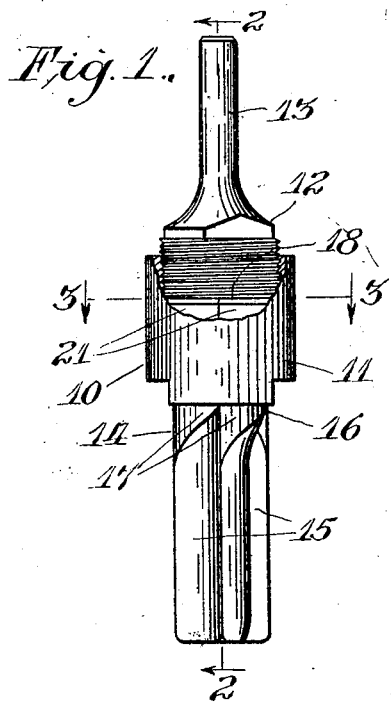
Figure 2:
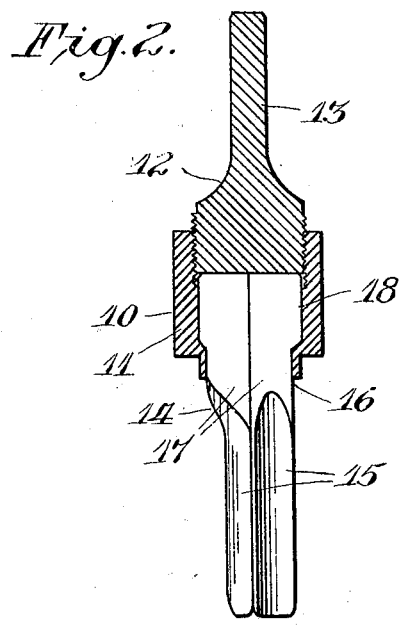
Figure 2 is a longitudinal section on the line 2—2 of Figure 1.
Figure 3:
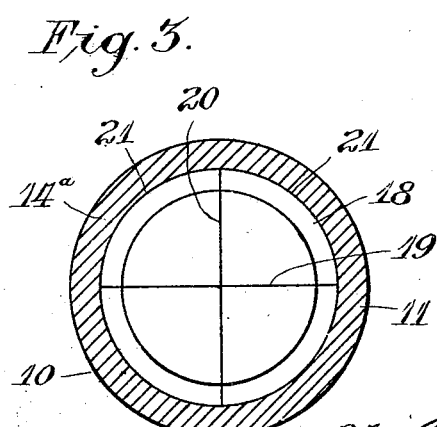
Figure 3 is a transverse section on the line 3—3 of Figure 1.

For an understanding of the invention, reference should be had first to Figures 1, 2 and 3 of the drawing. The chuck is designated by the numeral 10, and this comprises a cylindrical body 11 having a constricted outer end terminating in an opening through which the tool projects, the other end of the body of the chuck being threaded to receive a cap or closure member 12. Said cap 12 has a depending stem or shank 13 which is adapted to be attached to the driven shaft or spindle or other instrumentality (not shown) whereby the chuck 10 may be rotated at any desired speed. Any suitable motive power may be applied to the shaft or spindle or other apparatus whereby to obtain the desired speed for the chuck 10.

The cap 12 has a threaded flange portion adapted to be inserted into the rear end of the chuck 10, and this portion of the cap may be hollowed out or otherwise shaped to provide for frictional or impinging engagement of the cap 12 upon the end of the tool adapted to be contained in the chuck 10, the distance which the cap 12 is forced into chuck 10 determining the security with which the tool or tool members hereinafter to be described are held in place in said chuck 10.

Only two forms or types of tools are shown. The form or type of tool shown in Figures 1, 2 and 3 differs from that shown in Figure 4 in the manner of its assembly. Of course the operating portion of the tool or tool parts may be modified to meet any particular condition. The tool here shown may be designated carving and routing tool, and it consists of a plurality of angularly disposed segmental or curved cutting members.

In Figures 1 and 3, the tool members are designated 14. They comprise an outwardly extending cutting portion 15 having sharpened edges and a cutting end. As will be noted from Figures 1 and 2, the extension or cutting portion 15 is trough-like or spooned, each longitudinal edge being adapted to provide a cutting edge, and the end edge also providing a cutting part.

The upper portion or section 16 of the tool members is adapted to be held within the chuck 10. Said upper part 16 comprises two sections, one a thickened portion indicated 17, which is adapted to project outwardly of the chuck body 10 and from which the tool part depends. The other enlarged portion 18 has two flat sides 19 and 20 which are perpendicular to one another, and a rounded intermediate side or surface 21, which comprises a quadrant or a segment of a circle.

The sides 19 and 20 are in alignment with the body portion of the part 17, while the rounded surface 21 provides a flange adapted to engage the constricted end 11 of the chuck 10. This flange prevents the tool parts from being forced out of the body of the chuck 10 when the cap 12 is firmly secured therein, and provides for the secure seating of said parts in said chuck 10.

Four tools, 14 when placed together comprise a complete circle if the segmental surfaces of the sides 21 are considered. The angle of the cutting portion 15 with respect to the enlarged portions 17 and 18 is such that the cutting surfaces or cutting portions 15 are angularly disposed one with respect to the other whereby a crossed S effect is obtained in transverse cross section at the outer end of the tool. The tool 14 is a most effective carving and cutting device, and is adapted to be routed through wood and other materials for the purpose of removing surplus material, for cutting wide grooves, and for other purposes.

The most casual inspection of the combination tool disclosed in Figures 1, 2 and 3 will show a device which is not capable of being manufactured as an integral member except under the greatest of cost. It is even doubtful whether such a tool could be manufactured and successfully operated as an integral member. The combination disclosed therefore, provides means for the production of new tools having higher efficiency than present tool structures and many new and diversified uses.

When the cap 12 is screwed into the chuck 10, the tool members 14 are held against displacement. They may work loose, but no damage can come therefrom before the device in which the chuck is being employed may be stopped. The tools 14, in practice, do not often work loose.

Figure 4:
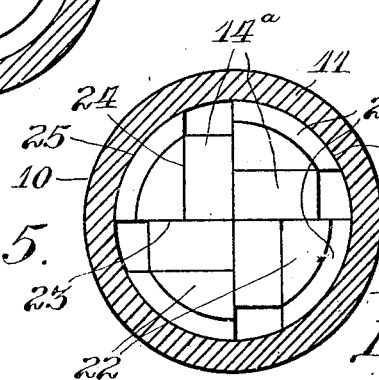
Figure 4 is a longitudinal section, similar to Figure 2, of a modified form of the tool.
Figure 5:
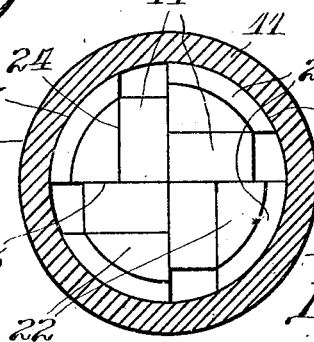
Figure 5 is a transverse section of such modified form of tool.

A second form of tool is shown in Figure 4. In that illustrated form of the invention, the cutting tool 14$^a$ has parallel sides, its structure being unlike that of the tool shown in Figures 1, 2 and 3, in that there is no flange portion thereon and in that the flat sides when arranged like the tools shown in Figure 2 do not form a complete circle at their outer edges or sides.

Intermediate each of the tools 14$^a$, which has a cutting portion 15$^a$ like the cutting portion 15 of tool 14, and an upper portion 16$^a$ like the cutting portion 16 of tool 14 is a filling in member 22, which has perpendicular flat sides 23 and 24, and a rounded side 25, the end of which is chamfered as shown at 26.

Said filling in part 22 is interchangeable and reversible, with respect to its ends, but one side 23 has a shorter radius than the other side 24, the side with the longer radius being adapted to rest against the broader side of a tool 14$^a$. The arrangement of the filler members 22 and the tools 14$^a$ is clearly shown in Figure 4. In the manner indicated a useful assembly of tools is obtained, and the cost of the individual cutting tools may be less than that for the individual cutting tools shown in Figures 1, 2 and 3. For convenience of assembly, of course, the arrangement shown in Figure 4 is not equal to that shown in the preceding figures, but for efficiency, the results obtainable therewith are substantially the same as the results obtained in the first form of the invention described.

The filling in member used in an assembly is always placed against the body of a tool 14$^a$. The impinging force of the cap 12 in the chuck 10 against the filler and the tools separated thereby provide for secure attachment for the tool 14$^a$ within the chuck 10.

It is quite manifest that other tools could be substituted for those here shown and each could have its own specific utility, and that the number of active tool parts could be from two up, but preferably three, four, or six.

The drawing illustrates the simple means for providing a multiple tool having many useful characteristics at the cost of a few simple tools, a decided advantage in tool making and tool using.

The principal use for a tool as illustrated is to remove surplus wood. It may be used both as a roughing or finishing tool. Much time will be saved in avoiding the changing of tools because of the double utility of this article.

As noted the tools may be made to form when assembled (with or without filling members) a member circular in cross section. The tool may be formed as a segment of circular stock or as the segment of a circle.

What I claim as new and desire to secure by Letters Patent of the United States, is:—

1. In a wood-working tool, the combination with a collar having a constricted opening therein communicating with the bore thereof, complemental cutting elements, each element terminating in an enlarged head complemental to each other in embracing relation with the bore of said collar to abut the constriction therein, and a shank adjustably associated with said collar to retain said complemental cutting elements in rigid relation.

2. In a wood-working tool, the combination with a collar having a constricted opening therein communicating with the bore thereof, complemental cutting elements, each element terminating in an enlarged head complemental to each other in embracing relation with the bore of said collar to abut the constriction therein, and a shank in threaded engagement with said collar to maintain said complemental cutting elements in rigid relation.

3. In a wood-working tool, the combination with a collar having a constricted opening therein communicating with the bore thereof, complemental cutting elements, each element terminating in an enlarged head complemental to each other in embracing relation with the bore of said collar to abut the constriction therein, a cap in threaded association with said bore to retain said cutting elements in rigid relation, and a shank fixed to said cap.

FRANK J. WIDMAN.